United States Patent [19]
Kita

[11] Patent Number: 5,534,872
[45] Date of Patent: Jul. 9, 1996

[54] PORTABLE RADIO SIGNAL DETECTING SYSTEM

[75] Inventor: Kazunori Kita, Mizuhomachi, Japan

[73] Assignee: Casio Computer Co., Ltd., Tokyo, Japan

[21] Appl. No.: 263,474

[22] Filed: Jun. 22, 1994

[30] Foreign Application Priority Data

Jun. 30, 1993 [JP] Japan .................................. 5-187557
Jun. 30, 1993 [JP] Japan .................................. 5-187559

[51] Int. Cl.⁶ .................................................. G01S 13/42
[52] U.S. Cl. .......................... 342/146; 342/175; 342/419; 342/443
[58] Field of Search .................................. 342/146, 147, 342/158, 175, 417, 419, 443, 449

[56] References Cited

U.S. PATENT DOCUMENTS

| | | | |
|---|---|---|---|
| 3,721,950 | 3/1973 | Jorgensen et al. | 342/51 X |
| 4,673,936 | 6/1987 | Kotoh | 342/51 |
| 4,949,072 | 8/1990 | Comerford et al. | 340/525 |
| 4,999,606 | 3/1991 | Comerford et al. | 340/525 |
| 5,414,427 | 5/1995 | Gunnarsson | 342/51 |

*Primary Examiner*—John B. Sotomayor
*Attorney, Agent, or Firm*—Frishauf, Holtz, Goodman, Langer & Chick

[57] ABSTRACT

In a radio signal detecting system, an antenna is rotatably mounted on a wrist watch type case, and this antenna is manually rotated to receive a radio signal reflected from a target to be distance-measured every time the antenna is rotated by a preselected rotation angle. The reflected radio signal is digitally converted into field strength data, or distance data. These field strength data, or distance data are sequentially stored into a memory circuit in correspondence with the rotation angle of the antenna. Since the data stored into the memory circuit at every rotation angle for the antenna are displayed on a liquid crystal display unit, the radio signal detecting system can be made compact and operated under low power consumption.

18 Claims, 13 Drawing Sheets

PORTABLE RADIO SIGNAL DETECTING SYSTEM

BACKGROUND OF THE INVENTION

1. Field of the Invention

The present invention generally relates to a radio signal detecting system capable of detecting a radio signal reflected from a target. More specifically, the present invention is directed to a compact radio signal detecting system capable of measuring a distance from the target and a direction of the target, and also capable of detecting azimuth of an incoming radio signal transmitted from other radio signal transmitter.

2. Description of the Prior Art

Radar systems have been widely utilized in air crafts and ships in order to navigate these vehicles and to confirm present positions of the vehicles with respect to a target, and also utilized in meteorological observations. Typically, in a radar system employed in one ship, an electromagnetic wave in a pulse form such as a microwave pulse signal, is transmitted from an antenna at a speed of 300,000 km/sec., and this pulse signal impinges other ships and a land. Then, pulse signals are reflected from these objects and processed to measure distances between this ship and other ships. These measured distances are displayed on a CRT display screen.

This type of conventional marine radar system comprises a large-scale transmitter apparatus with employment of a magnetron and the like, a bulky rotary slot antenna having a length of 1 to 3 m and an antenna unit, a display apparatus equipped with an after-image type large CRT screen, and a motor unit for rotating the slot antenna. Accordingly, this marine radar system has various merits, e.g., high power, high precision, and hard operation conditions. However, there are drawbacks such as a bulky system and high power consumption.

On the other hand, in commercial ships such as fishing boats and container carrier ships, and salvage stations, azimuth detecting systems are utilized to correctly detect azimuth of a signal radiation source by measuring azimuth of an incoming radio signal having a specific frequency. In the azimuth detecting system, the incoming radio signals are received by the first loop-shaped antenna and the second vertically-arranged antenna. The first loop antenna is rotated to receive the radio signals at every preselected rotation angle, and field strengths of these received radio signals are measured. Then, the direction of one radio signal having the highest field strength is detected as the direction of the incoming radio signal reflected from the target. Since this first loop, antenna inherently owns such an antenna characteristic that the field strengths become high when the first loop antenna is located at 90° and 270° with respect to the direction of the incoming radio signal, a decision is made which incoming signal angle corresponds to the incoming direction of the radio signal based upon directivity of the second antenna. In other words, the radio signal received by the first loop antenna is synthesized with the radio signal received by the second antenna, thereby determining the incoming direction of the radio signal. Thereafter, the synthesized signal is amplified, and the field strengths of the synthesized signal with regard to the rotation angles of the first loop antenna are displayed on a CRT display screen as a circular graphic representation.

However, the above-described conventional azimuth detecting systems have similar problems to those of the conventional radar systems. That is, very high technology is required to operate such conventional azimuth detecting systems, so that only well skilled operators can handle these azimuth detecting systems.

SUMMARY OF THE INVENTION

The present invention has been made to solve the above-described conventional problems, and therefore, has an object to provide a radio signal detecting system made compact and light weight.

Another object of the present invention is to provide a portable radio signal detecting system operable by any operators who are not skilled operators, and suitable to outdoor use.

To achieve the above-described objects, a radio signal detecting system according to an aspect of the present invention is characterized by comprising:

a rotatable antenna;

distance measuring means for transmitting a radio signal every time the antenna is rotated by a preselected rotation angle, and for receiving another radio signal reflected from a target to be measured to process the reflected radio signal, thereby producing distance data;

memory means for storing the distance data produced by the distance measuring means in correspondence with the rotation angle of the antenna; and display means for displaying the distance data read out from the memory means.

Also, a radio signal detecting system according to another aspect of the present invention is characterized by comprising:

a wrist-watch-shaped case;

an antenna rotatably mounted on the wrist-watch-shaped case;

timer circuit means provided within said case, for producing present time information;

time display means for displaying the present time information produced by said time circuit means;

distance measuring means for transmitting a radio signal every time the antenna is rotated by a preselected rotation angle, and for receiving another radio signal reflected from a target to be measured to process the reflected radio signal, thereby producing distance data;

memory means for storing the distance data produced by the distance measuring means in correspondence with the rotation angle of the antenna; and display means for displaying the distance data read out from the memory means.

BRIEF DESCRIPTION OF THE DRAWINGS

For a better understanding of the present invention, reference is made of the detailed description to be read in conjunction with the accompanying drawings, in which.

DETAILED DESCRIPTION OF THE PREFERRED EMBODIMENT

OVERALL CIRCUIT ARRANGEMENT OF FIRST RADIO SIGNAL DETECTING SYSTEM

Figure 1:
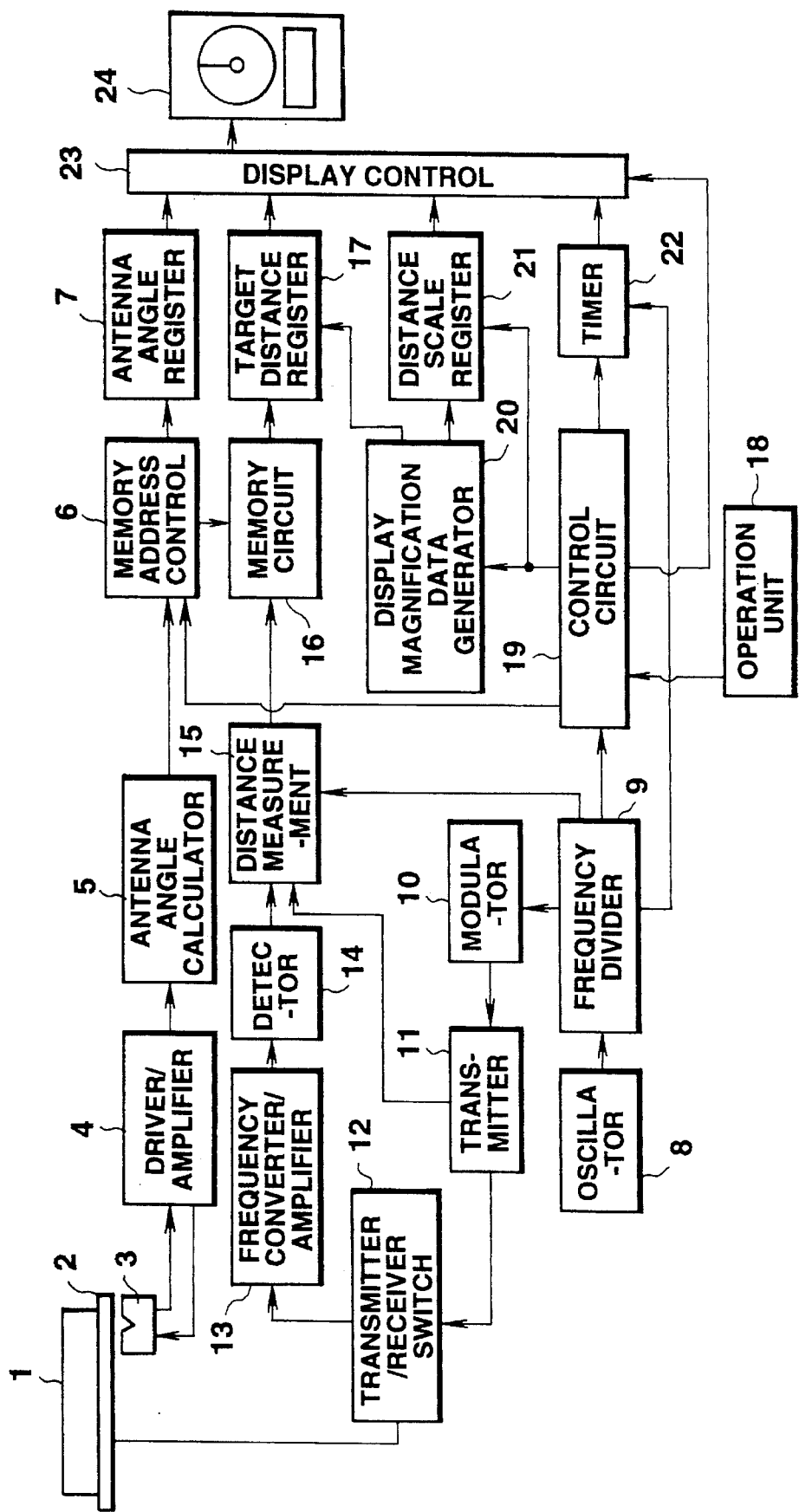
FIG. 1 is a schematic block diagram for representing an overall circuit arrangement of a radio signal detecting system according to a first preferred embodiment of the present invention.
Figure 2:
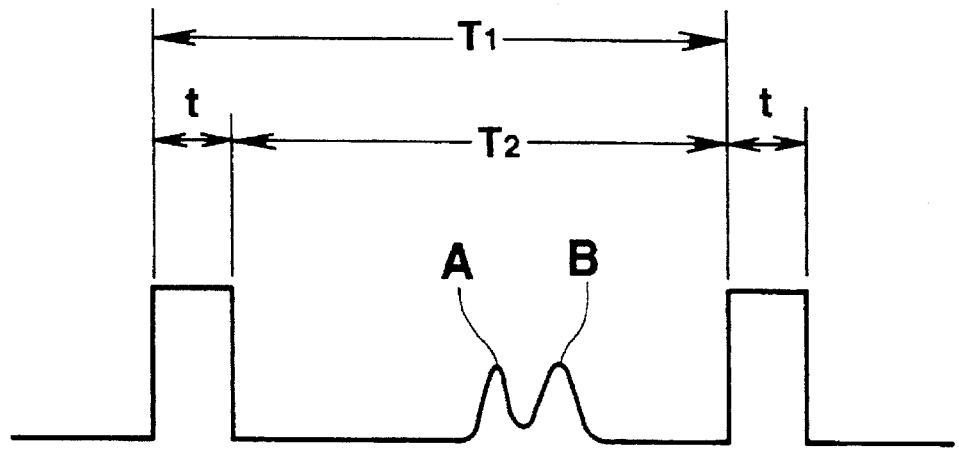
FIG. 2 shows a waveform of a pulse signal transmitted/received in the first radio signal detecting system of FIG. 1.
Figure 3:
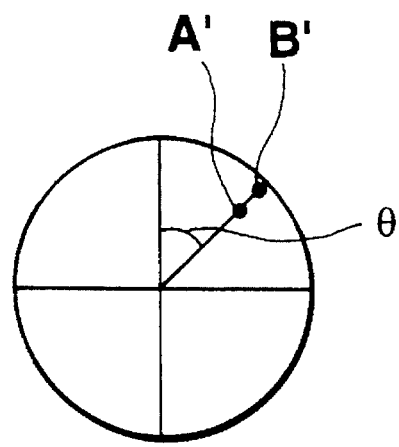
FIG. 3 schematically illustrates a display sample of the first radio signal detecting system as a front view.

Referring now to FIG. 1 to FIG. 3, a description will be made of a radio signal detecting system assembled in an electronic wrist watch, according to a first presently preferred embodiment of the present invention.

In FIG. 1, there is shown an overall circuit arrangement of the first radio signal detecting system. In this first radio signal detecting system, a compact antenna 1 is mounted on a rotation supporting member 2, so that the antenna 1 is integrally rotatable in conjunction with the rotation of the rotation supporting member 2. The rotating operation of this rotation supporting member 2 is manually performed, and detected by a rotation angle detecting sensor 3. As this rotation angle detecting sensor 3, it may be so arranged that light/dark marks made from slits or black/white marks are formed on the same circular of the rotation supporting member 2, and these light/dark marks are detected by way of a photocoupler constructed of a light emitting diode (LED) and a phototransistor, whereby the rotation angles of the rotation supporting member 2 are detected in the form of pulse number.

A clock pulse indicative of the rotation angle of the antenna 1, which is outputted from this rotation angle detecting sensor 3, is entered via a driving/amplifying circuit 4 into an antenna angle calculating circuit 5. The number of clock pulses is added to each other, and thus, is outputted as angle data about the antenna 1 from this antenna angle calculating circuit 5. The derived angle data is stored via a memory address control circuit 6 into an antenna angle register 7, and then displayed on a display unit 24.

An oscillator circuit 8, a frequency dividing circuit 9, a control circuit 19, and a timer circuit 22 will constitute an electronic watch circuit. That is, the oscillator circuit 8 oscillates a reference frequency pulse functioning as a reference timing signal. The frequency dividing circuit 9 frequency-divides this reference frequency pulse to obtain a frequency-divided pulse. The frequency-divided pulse is supplied via the control circuit 19 to the timer circuit 22 for performing the time counting operation. Accordingly, present time is displayed on the display unit 24 under control by the display control circuit 23.

In this first embodiment, the reference frequency pulse which has been frequency-divided by the frequency dividing circuit 9, is also outputted to a modulating circuit 10. This frequency-divided pulse is modulated by a high (radio) frequency signal in the modulating circuit 10. The modulated radio frequency signal is furnished to a transmitter circuit 11. The transmitter circuit 11 supplies a transmission pulse signal to a transmitter/receiver switching circuit 12, and also supplies a signal synchronized with this transmission pulse signal to a distance measuring circuit 15.

The transmitter/receiver switching circuit 12 switches radiation of the radio signal (electromagnetic wave) carried out by the above-explained transmission pulse signal through the antenna 1, and receptions of the radio signal reflected from a target. The reflected radio signals received by this transmitter/receiver switching circuit 12 are amplified by a frequency converting/amplifying circuit 13, and thereafter the amplified radio signals are detected by a detecting circuit 14, so that the detected radio signals are furnished to the distance measuring circuit 15. The distance measuring circuit 15 measures a time period since the signal synchronized with the above-explained transmission pulse signal is supplied from the transmitter circuit 11 until the reflected radio signals which have been detected by the detecting circuit 14 are inputted. Then, the distance measuring circuit 15 outputs distance data based on this measured time period. This time period measuring operation is carried out by utilizing the clock pulse derived from the frequency dividing circuit 9. This distance data corresponds to digital data indicative of a distance between a target and this radio signal detecting system. This distance data is supplied to a memory circuit 16 constructed of such an electronic memory as a RAM (random access memory).

The memory circuit 16 contains a large number of memory regions for storing the distance data about the target, and the respective memory regions are addressed by the address control circuit 6 to which the angle data derived from the antenna angle calculating circuit 5 are supplied as the address data.

For instance, since the distance data in correspondence with every 10° (degrees) with respect to one rotation angle (360°) of the antenna 1 may be stored in the memory circuit 15, this memory circuit 15 is arranged by the memory regions capable of storing 38 pieces of distance data. These distance data stored in the memory circuit, are read out therefrom and stored via the control circuit 19 and the memory address control circuit 6 into a target distance register 17 by operating a distance display button (not shown) provided on an operation unit 18, and further are displayed on the display unit 24. This distance data display is continued until this distance display button is subsequently manipulated. A display-magnification-data output circuit 20 controls the display magnification of the distance data to be displayed. Precisely speaking, when a magnification selecting key (not shown either) of the operation unit 18 is operated to designate desired display magnification, the magnification data designated via the control circuit 20 by the display-magnification-data output circuit 20 is supplied to the target distance register 17 and a distance scale register 21, so that the distance data is displayed in the designated magnification, and also a scale adjusted in accordance with the designated magnification is displayed.

OPERATION OF FIRST RADIO SIGNAL DETECTING SYSTEM

In the first radio signal detecting system shown in FIG. 1, a transmission pulse is transmitted from the antenna 1 and a reception pulse is received from this antenna 1 as represented in FIG. 2. The transmission pulse is transmitted with a time width "L" in a time period "T1", and the reception pulse (reflection pulses "A" and "B") is received between the successive transmission pulses within a time period T2 (see FIG. 2). That is, for example, when a first transmission pulse is transmitted with a time width "L", the antenna 1 is switched from the transmission mode to the reception mode during another time period "T2". During this time period "T2", the electromagnetic waves reflected from the target (not shown in detail) are received via the antenna 1 by the first radio signal detecting system. When, for instance, two reflection pulse signals "A" and "B" are received under such a condition that the antenna 1 has been rotated by an angle "O" during this time interval T2, such a representation that two targets A' and B' are present is made on the display unit 24, as illustrated in FIG. 3.

In the above-explained first radio signal detecting system, microwaves having very low signal levels, and FM signals of quasi-microwave band waves such as UHF waves and VHF waves may be utilized as the transmission pulse from the antenna 1. As a consequence, although the distance measuring range of this first radio signal detecting system would be narrowed to some extent because of using such high frequency signals, there are various merits that the circuit arrangement for transmitting/receiving the pulse signals could be made compact, and furthermore this transmitting/receiving circuit arrangement could be manufactured as an integrated circuit in combination with the control circuit 19, the timer circuit 22, and the antenna angle calculating circuit 5.

Further, when such a liquid crystal display (LCD) operable under very small currents on the order of microampere is employed as the display unit 24, power consumption of this first radio signal detecting system can be reduced. Accordingly, this LCD display unit may be operated by small-sized batteries such as dry cells and button type cells, which are originally used to operate other circuit arrangements. As a consequence, since no longer commercial power source with high capacity is required to operate the first radio signal detecting system, this detecting system can be furthermore made compact.

Under such circumstances, the first radio signal detecting system may be manufactured in the form of compact electronic appliances, e.g., a wrist watch, a desk top calculator, and an electronic notebook. Moreover, this system may be realized as portable outdoor gears.

CIRCUIT ARRANGEMENT OF SECOND RADIO SIGNAL DETECTING SYSTEM

Figure 4:
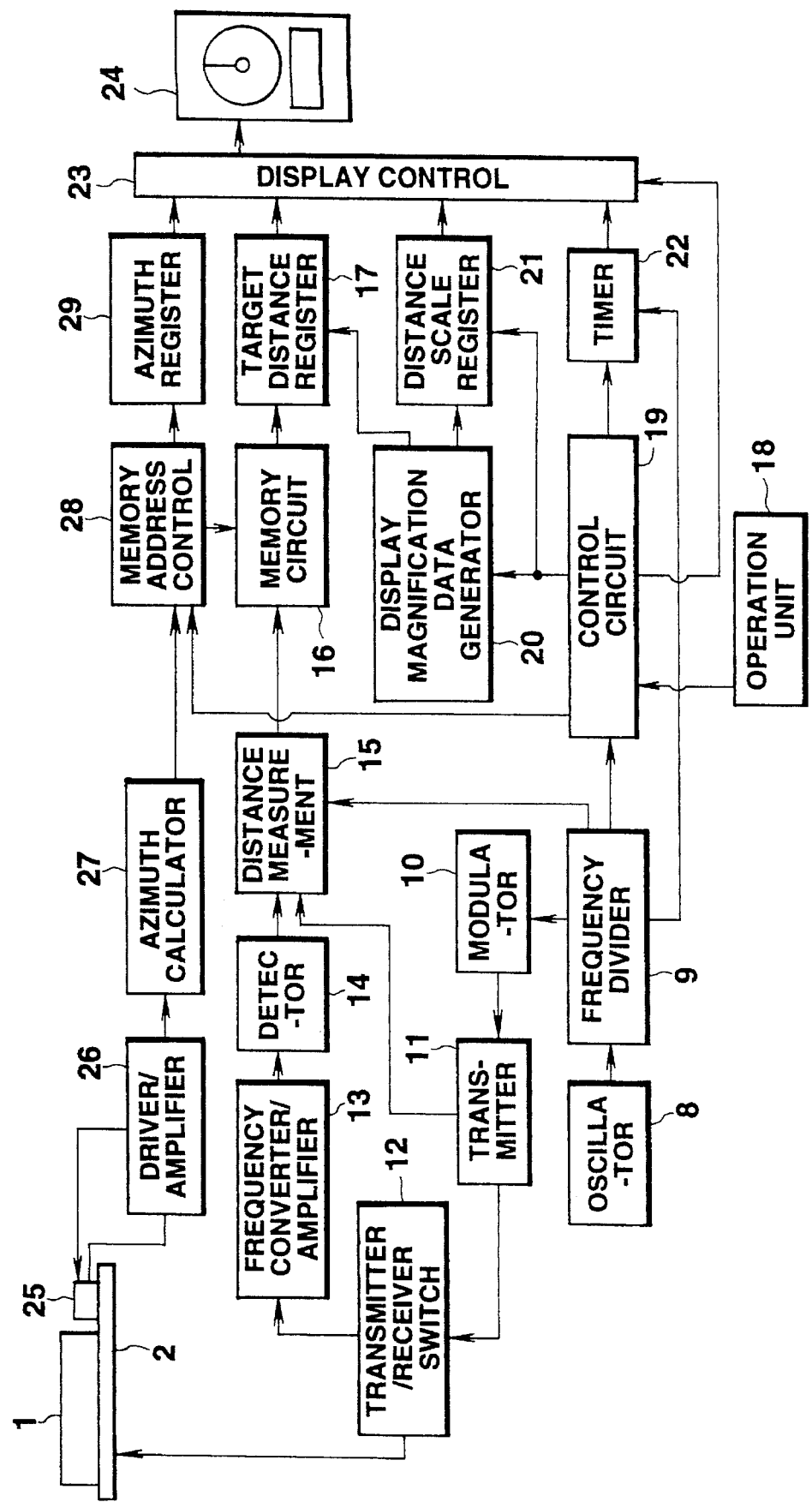
FIG. 4 is a schematic block diagram for showing an overall circuit arrangement of a radio signal detecting system according to a second preferred embodiment of the present invention.

FIG. 4 represents an overall circuit arrangement of a radio signal detecting system according to a second presently preferred embodiment of the present invention. It should be noted that the same reference numerals shown in FIG. 1 will be employed as those for indicating the same circuit blocks represented in FIG. 4 and other relevant figures, and no further explanations thereof are made in the following descriptions. As a feature of this second radio signal detecting system, an electronic azimuth sensor 25 such as magnetic sensor is provided on the rotation supporting member 2 of the antenna 1. The electronic azimuth sensor 25 detects the (toward) directions of the antenna 1 which are changed in response to the rotations of this antenna 1, to produce azimuth signals on the basis of the compass north. The azimuth signal detected by this electronic azimuth sensor 25 is supplied via a driving/amplifying circuit 26 to an azimuth calculating circuit 27 so as to be calculated as digital azimuth data. Then, the calculated azimuth data is inputted into a memory address control circuit 28, and is used as address data of the memory circuit 16. Further, this azimuth register 29 and displayed on the display unit 24.

OPERATION OF SECOND RADIO SIGNAL DETECTING SYSTEM

In the above-explained second radio signal detecting system, the azimuth data is used as the address data of the memory circuit instead of the previously explained rotation angle data of the antenna employed in the first radio signal detecting system. As a result, since the overall radio signal detecting system is not required to be fixed, the rotation angle of the antenna 1 can be firmly detected even when this second system is slightly swung, or moved. To the contrary, the overall first system must be fixed and the rotation angle of the antenna 1 must be judged, or recognized in accordance with the relative position with respect to this previous first system.

Alternatively, according to the modifications of the second embodiment, the electronic azimuth sensor 25 may be assembled within the second radio signal detecting system. In this case, it is possible to measure distances about a target with respect to various azimuth positions.

Furthermore, even when the mechanism for rotating the antenna 1 is not employed, the distance measuring operation can be performed and the second radio signal detecting system can be made further compact, as compared with the first radio signal detecting system.

As previously described, in accordance with the second embodiment, since both the distance and the azimuth of the target in correspondence with the absolute azimuth are displayed, high-precision target measurement and display can be realized with easy operations.

CIRCUIT ARRANGEMENT OF THIRD RADIO SIGNAL DETECTING SYSTEM

Figure 5:
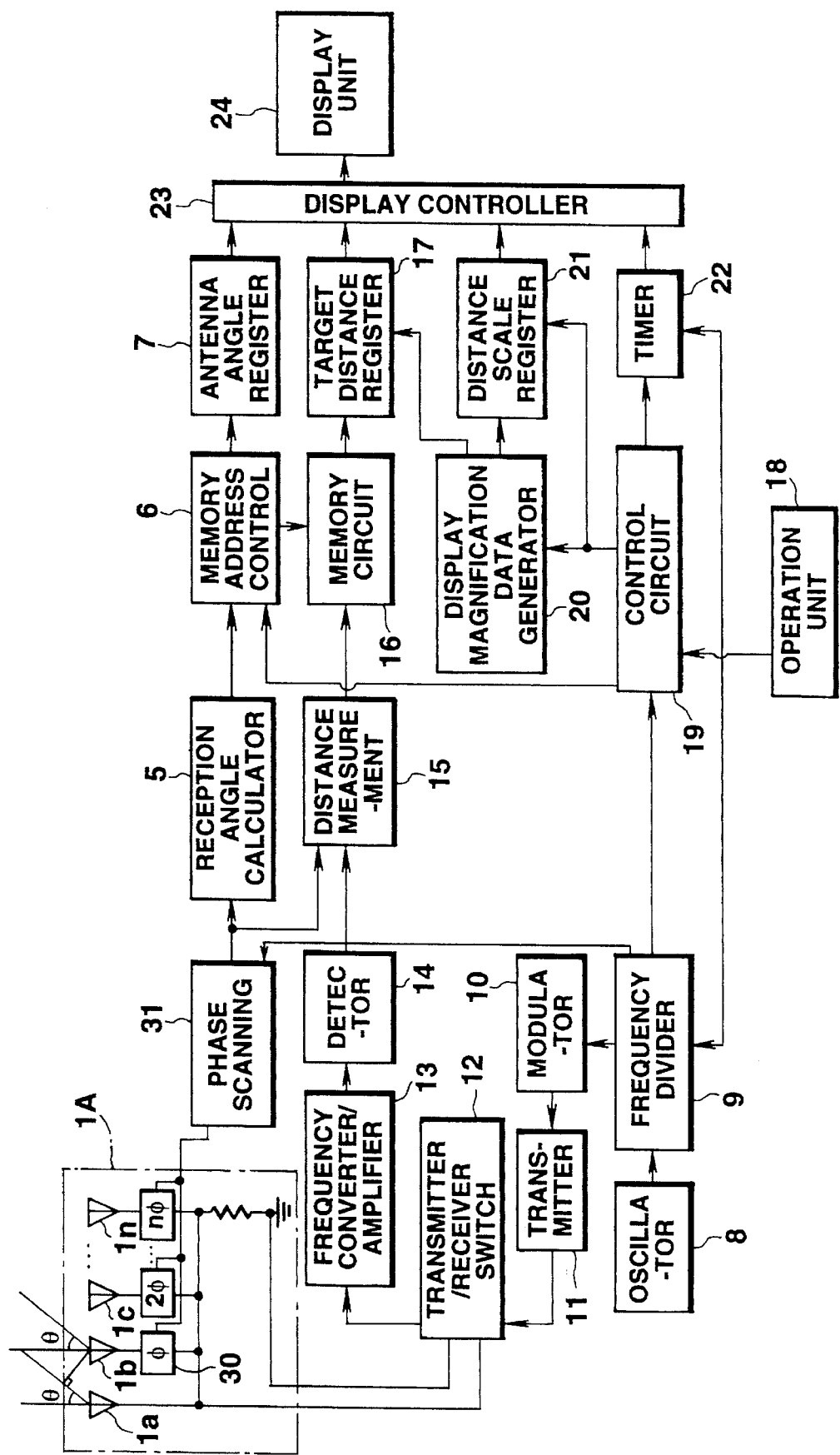
FIG. 5 is a schematic block: diagram for indicating an overall circuit arrangement of a radio signal detecting system according to a third preferred embodiment of the present invention.
Figure 6:
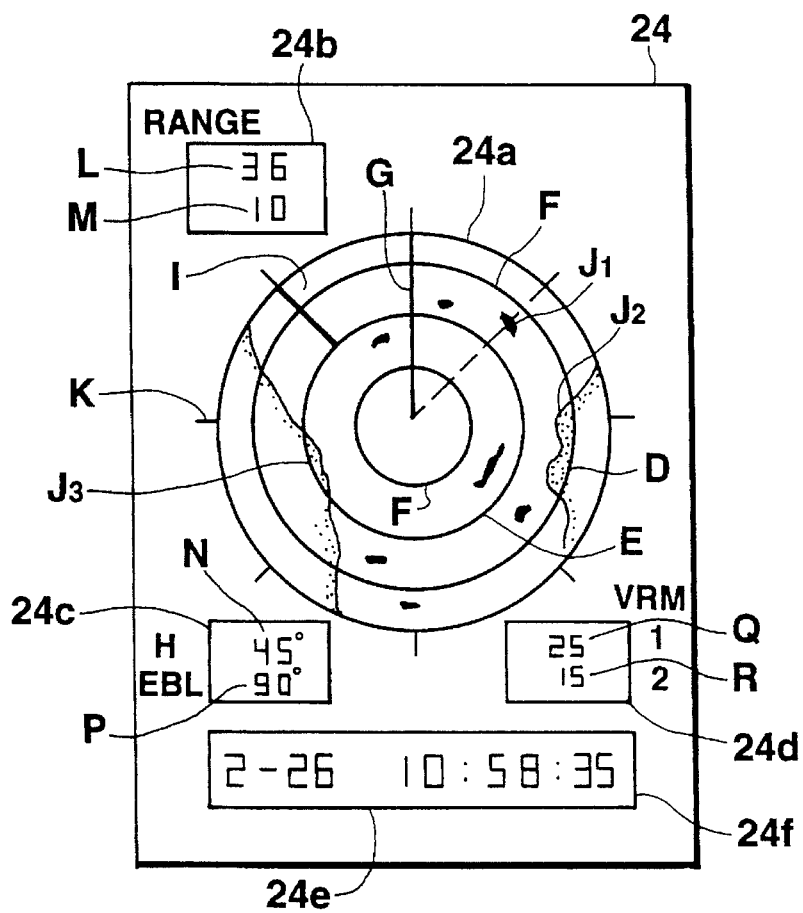
FIG. 6 schematically illustrates a display sample of a display unit employed in the first to third radio signal detecting systems.

In FIG. 5, there is shown an overall circuit arrangement of a radio signal detecting system according to a third currently preferred embodiment of the present invention.

As apparent from this FIG. 5, only a structure of an antenna 1A of this third radio signal detecting system is different from that of the antenna 1 employed in the first radio signal detecting system indicated in FIG. 1. That is, this antenna 1A is constructed by arranging a plurality of array antennas 1a, 1b, ..., 1n ("n" being any integers greater than 1). As the array antennas 1a, 1b, ..., 1n, slit-shaped elongate opening portions are formed in a waveguide at equi-intervals, and these array antennas are mounted on the respective opening portions of this waveguide along the upright direction, resulting in the antenna 1A. Then, both the direction and the distance from the target are measured by electronically scanning the respective array antennas 1a, 1b, ..., 1n. In accordance with the third embodiment, since the antenna 1A itself is not required to be rotated, the configuration of the entire system can be made simpler and portability of this third system can be further improved.

VARIOUS DISPLAY FORMS

Figure 8:
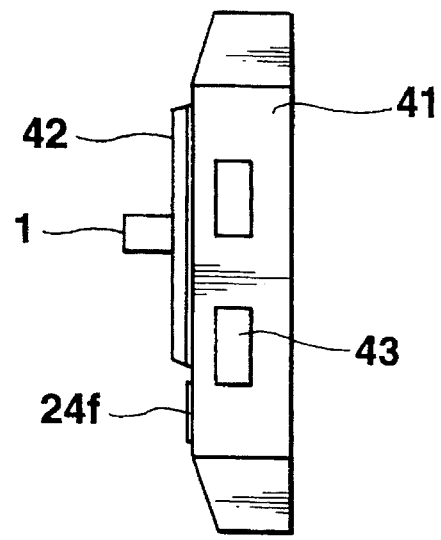
FIG. 8 is a side view for showing the first to third radio signal detecting systems.

FIG. 8 is a detailed display form of the display unit 24 according to any of the first to third radio signal detecting systems. The display unit 24 owns a first display screen 24a made of a liquid crystal display (LCD) member. Toroidal-shaped distance scales D, E, F are concentrically displayed on this first display screen 24a. A line "G" is displayed as a heading mark from the center toward the upper position. Further, another line "H" is rotatably displayed in response to the rotation of the antenna 1A. When the azimuth sensor 25 is additionally employed as the second radio signal detecting system, a north mark "I" is displayed. Then, the target marks J1, J2, J3, ..., Jn measured by these first to third systems are displayed together with these marks.

It should be understood that an azimuth scale "K" is represented on the peripheral portion of the first display screen 24a by way of printing and a carved seal. On a second display screen 24b of the LCD display unit 24, the distance range "L", and the interval "M" of the distance scales D, E, F displayed on the first display screen 24a are displayed as a digital value. On a third display screen 24c of this LCD display unit 24, the azimuth "N" of the heading mark G and the azimuth "P" of the line H are displayed as a digital value. On "Q" and "R" of a fourth display screen 24d of this LCD display unit 24, there are represented a digital value indicative of a distance up to the distance scale "D" positioned outside the display screen 24a, and a digital value indicative of a distance up to the distance scale "E". Furthermore, present month/day/time are displayed in the digital forms on a fifth display screen 24e of the LCD display unit 25.

Figure 7:
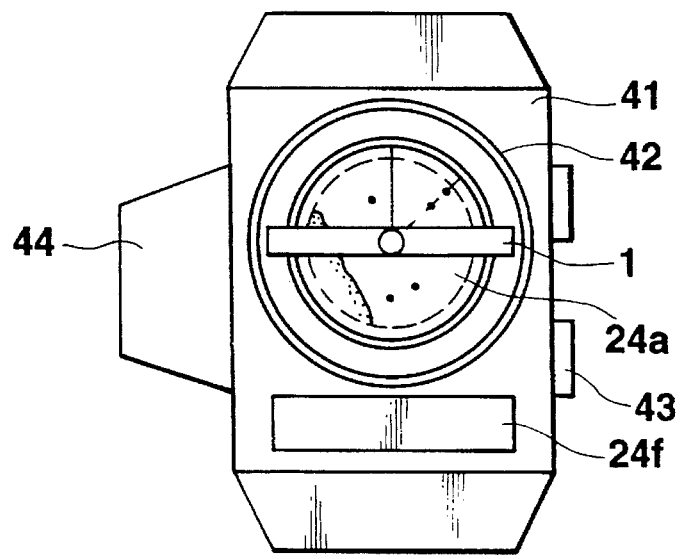
FIG. 7 is a front view for showing an outer appearance of the first to third radio signal detecting systems.

FIGS. 7 and 8 show outer appearances of wrist watches into which the above-described first to third radio signal detecting systems have been embodied.

A case 41 is fabricated as a wrist watch case. A rotary vessel 42 is rotatably fixed on the upper surface of this wrist watch case. This rotary vessel 42 corresponds to the above-explained rotation supporting member 2. Thus, the antenna 1 is mounted on this rotary vessel 42, and the antenna 1 is rotated by manually rotating this rotary vessel 42.

As previously explained, in such a system configuration where the antenna 1 is manually rotated, no electric motor is required and this power consumption can be lowered and also the system can be made compact. Reference numeral 43 denotes an operation button arranged on the side surface of this case 41, and reference numeral 44 show an electronic azimuth sensor provided on another side of this case 41. It should be noted that the first display screen 24a to the sixth display screen 24f are arranged on the upper surface of the case 41.

Figure 9:
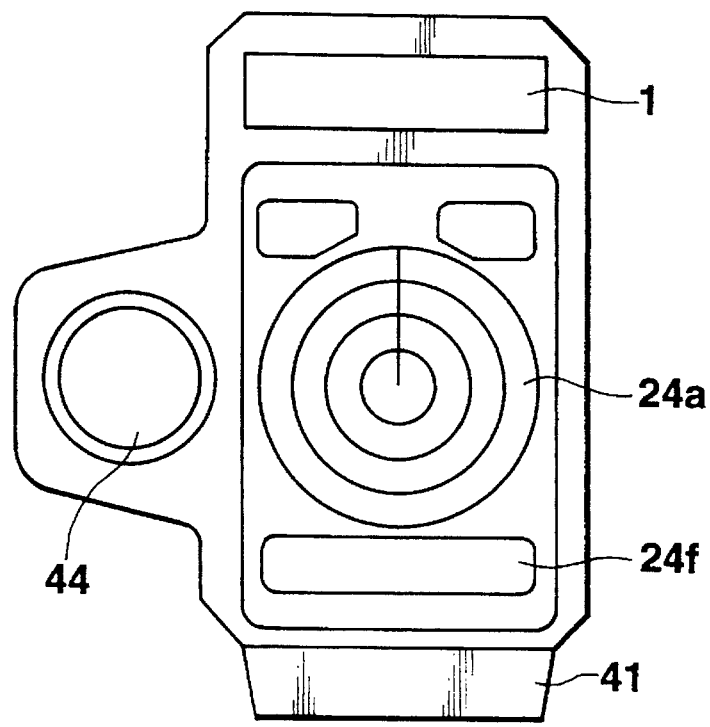
FIG. 9 is a front view for indicating another outer appearance of the first to third radio signal detecting systems.

FIG. 9 represents another example of an outer appearance of the radio signal detecting system. The same constructive elements are indicated by the same reference numerals as employed in FIG. 7 and FIG. 8. In this outer appearance example, the antenna i is fixed on the case 41.

FOURTH RADIO SIGNAL DETECTING SYSTEM

Referring now to FIG. 10 to FIG. 15, a radio signal detecting system according to a fourth embodiment of the present invention will be explained.

Figure 10:
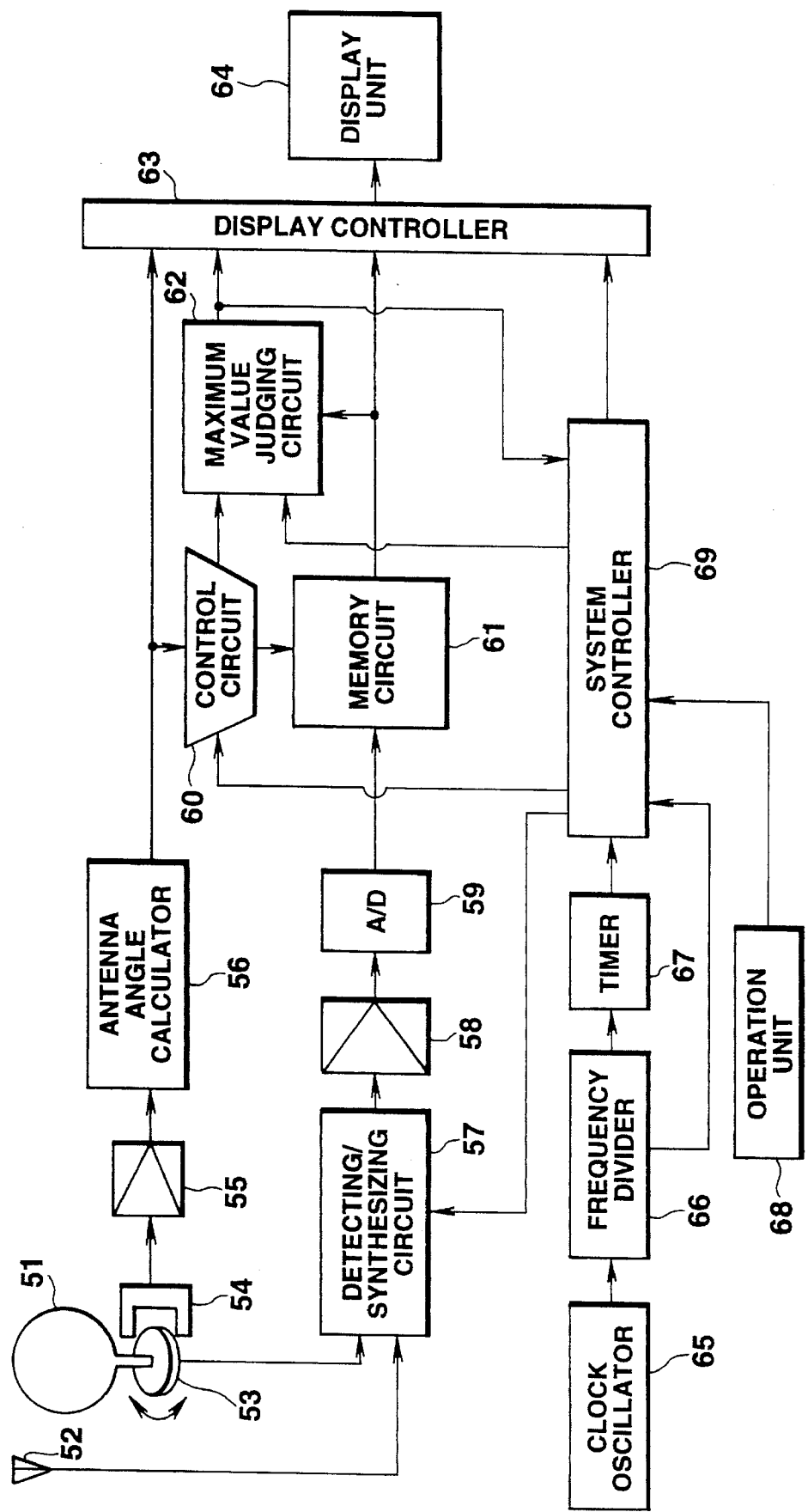
FIG. 10 is a schematic block diagram for indicating an overall circuit arrangement of a radio signal detecting system according to a fourth preferred embodiment of the present invention.

First, FIG. 10 schematically shows an overall arrangement of the fourth radio signal detecting system. In this fourth radio signal detecting system, there are provided a first antenna 51 formed in a loop shape and a second antenna 52 which is separated from the first antenna 51 and is positioned along the vertical direction. The first antenna 51 is vertically mounted on a rotation supporting member 53 which is rotatable in a 360° range. When this rotation supporting member 53 is rotated, the first antenna 51 is integrally rotated in conjunction with the rotation supporting member 53. The rotation angles of the rotation supporting member 53, namely the rotation angles of the first antenna 51 are detected by a rotation angle position detecting sensor 54 constructed as, for instance, a photocoupler. The detected rotation angles are derived as rotation angle signals from this sensor 54, and are amplified by a sense amplifier 55. The amplified rotation angle signals are supplied to an antenna angle calculating circuit 58 to obtain azimuth angle data.

On the other hand, the radio signals received by the first antenna 51 and the second antenna 52 are entered into a detecting/synthesizing circuit 57 to be detected and then synthesized with each other, thereby producing field strength data. The field strength data is amplified by an amplifying circuit 58, and thereafter converted into a digital field strength value by an A/D-converting circuit 59. Thus, this field strength data is stored into a memory circuit 61 constructed of an electronic memory such as a RAM. In the memory circuit 61, the field strength data are stored as digital values at addresses corresponding to the various directional angels under control of a memory address control/read/write control circuit 60. In this manner, after the first antenna 51 has been rotated for every preselected angle by either the manual scanning operation, or the automatic scanning operation over 0° to 360° fields, the field strength data corresponding to the respective rotation angles aide stored into the memory circuit 61. Then, the field strength data stored in the memory circuit 61 are supplied via a display control circuit 63 to a display unit 84 such as a liquid crystal display (LCD) for display purposes. In this case, when the rotation angle of the first antenna 51 is supplied from the antenna angle calculating circuit 6 into the display control circuit 63, this azimuth angle is displayed on the display unit 64 under control of the display control circuit.

Reference numeral 62 indicates a maximum value judging circuit. The maximum value judging circuit sequentially reads the field strength data out from the memory circuit 61, and makes a decision on the azimuth angle of the highest field strength data among these field strength data, so that this azimuth angle is determined as the direction of the radio signal reflected from the target (not shown in detail). Thus, the determined signal coming direction is displayed on the display unit under control of the display control circuit 63.

In addition to the above-described azimuth measuring function, a timer function is provided with the fourth radio signal detecting system. Referring back to the overall circuit arrangement shown in FIG. 10, a clock signal oscillating circuit 65 is provided to oscillate a clock signal which is used as a time reference pulse signal. This reference pulse signal is frequency-divided by a frequency dividing circuit and the frequency-divided pulse signal is furnished to a timer circuit 67 and also via a system control circuit 69 to the display control circuit 63. As a result, present time is displayed on the display unit 64. It should be noted that the system control circuit 69 is employed to control the overall operation of the fourth radio signal detecting system, and an operation unit 68 is manipulated by an operator so as the select data to be displayed on the display unit 64.

DISPLAY SAMPLES OF FOURTH RADIO SIGNAL DETECTING SYSTEM

Figure 11A:
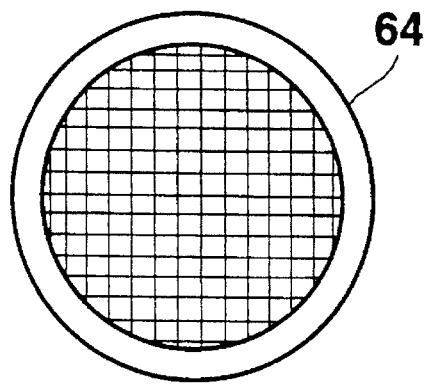
FIGS. 11A to 11F schematically represent display samples of the display unit employed in the fourth radio signal detecting system.
Figure 11B:
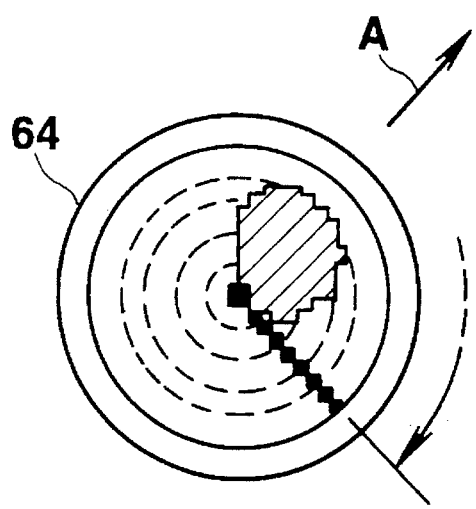
Figure 11C:
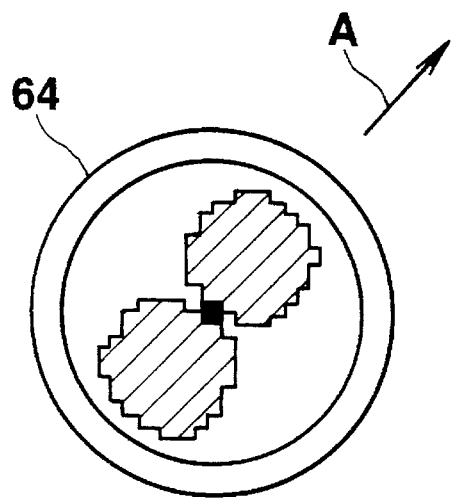
Figure 11D:
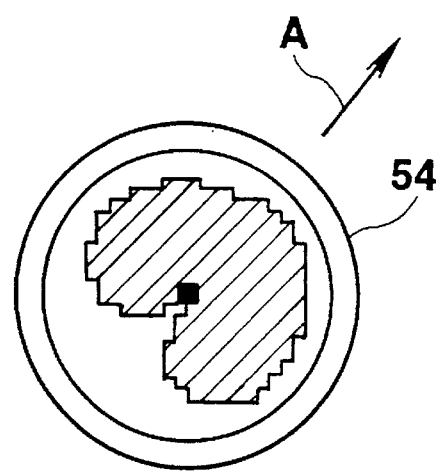
Figure 11E:
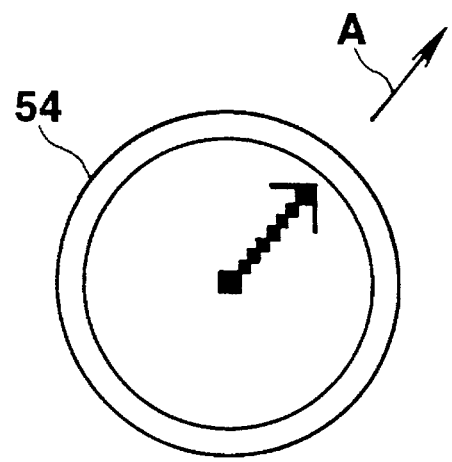
Figure 11F:
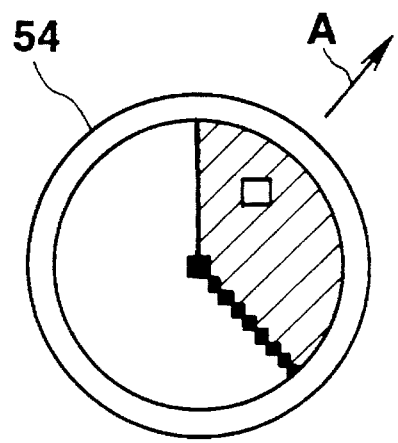

FIG. 11A to FIG. 11F illustrate display samples of the display unit 64 in the fourth radio signal detecting system. Before the first antenna 51 is manually, or automatically rotated, no indication is seen on the display unit 64 (see FIG. 11A). Then, when the first antenna 1 is commenced to be rotated, the field strengths of the incoming radio signals which have been processed in accordance with the above-explained manner, are successively displayed on the LCD screen of the display unit 64 as follows: As shown in FIG. 11B, the first antenna 51 is being swept, and a side "A" of the signal incoming direction on the LCD screen is turned ON. FIG. 11C represents such a condition that the first sweeping operation by the first antenna 51 is complete, in which both the side "A" and an opposite side thereof on the LCD screen are turned ON. FIG. 11D indicates such a condition that the radio signal information derived from the first antenna 51 is synthesized with the radio signal information derived from the second antenna 52, in which the side "A" of the signal incoming direction is continuously turned ON. Thereafter, the maximum value judging circuit 62 may judge the maximum value among the incoming signal levels (field strengths) to determine the radio signal incoming direction. As a result, the determined signal incoming direction is represented by an arrow as illustrated in FIG. 11E. FIG. 11F represents such a condition that the first antenna 51 is being swept during the second sweeping operation, and the arrow indication for the first sweeping operation shown in FIG. 11E is superimposed with this screen display and displayed by a white frame.

OUTER APPEARANCES OF FOURTH RADIO SIGNAL DETECTING SYSTEM

Figure 12:
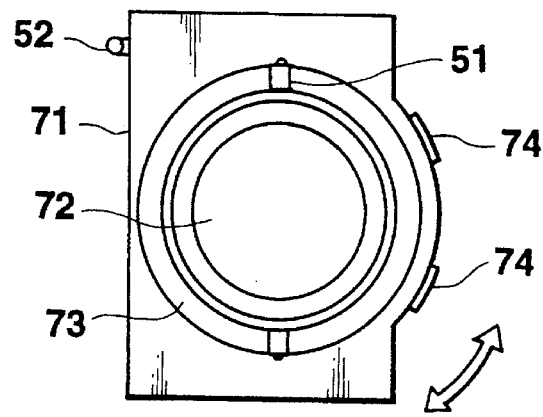
FIG. 12 is a plan view for indicating an outer configuration of the fourth radio signal detecting system.
Figure 13:
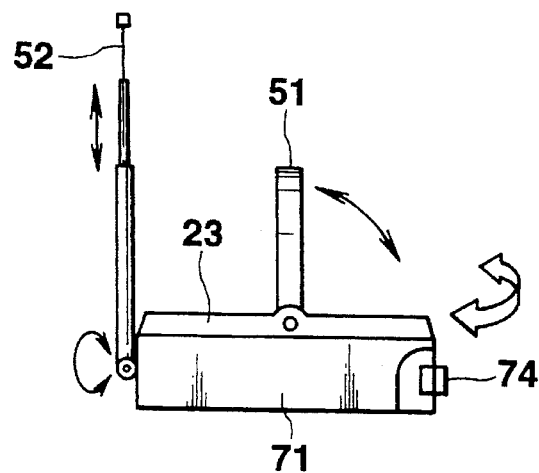
FIG. 13 is a side view for showing the outer configuration of the fourth radio signal detecting system.
Figure 14:
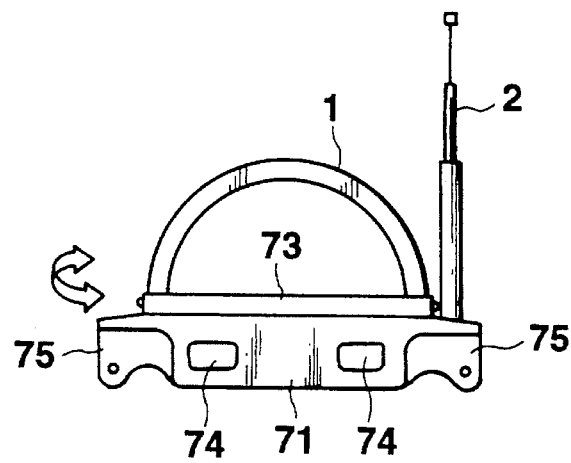
FIG. 14 is a side view for representing another outer configuration of the fourth radio signal detecting system.

FIG. 12 to FIG. 14 show various outer appearances of the fourth radio signal detecting system indicated in FIG. 10. Reference numeral 71 indicates a wrist watch type case in which the circuit arrangement of the fourth radio signal detecting system is installed. An LCD display screen for constituting the display unit 74 is provided on an upper surface of this case 71. A toroidal-shaped rotary bezel 73 is arranged around the LCD display screen at the upper surface of the case 71. The first antenna 51 having a loop shape is mounted on this rotary bezel 73 in such a manner that this loop antenna 51 can rise up from the rotary bezel 73. Accordingly, the rotary bezel 73 constitutes the rotation supporting member 53 shown in FIG. 10. On the other hand, the second antenna 52 is mounted on the side surface of the case 71 in such a way that the second antenna 52 is rotatably fixed thereon and is retractable. As previously described in detail, since both the first antenna 51 and the second antenna 52 are collapsable, no projecting portion is made in this wrist watch type case, so that this case may be easily handled when the fourth radio signal detecting system is not under operation. Reference numeral 74 denotes an operation button, and reference numeral 75 represents a mounting portion of a watch belt (not shown).

Figure 15A:
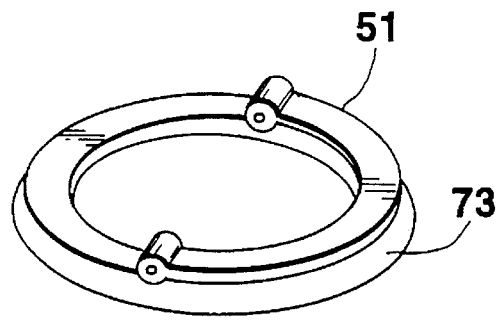
FIGS. 15A to 15D are perspective views for indicating various operations of a first antenna.
Figure 15B:
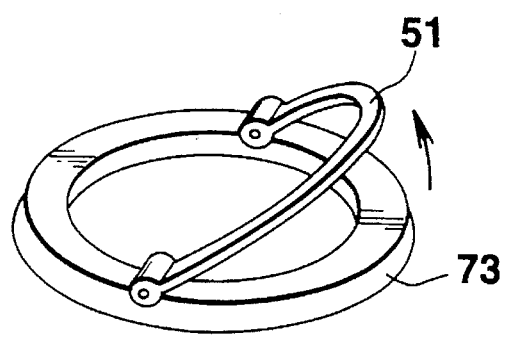
Figure 15C:
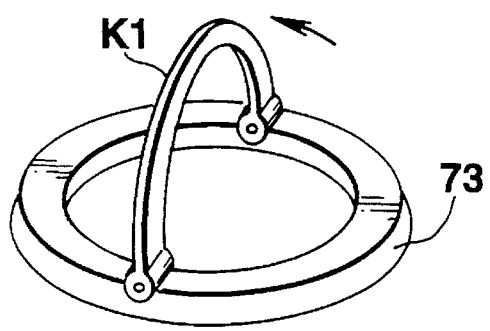
Figure 15D:
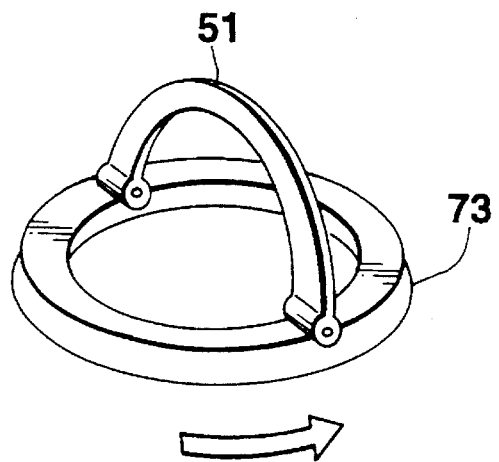

FIG. 15A through FIG. 15D illustrate how to mount/stand the first antenna 51 with respect to the above-explained rotary bezel 73. As shown in FIG. 15A, the first antenna 51 is laid on the rotary bezel 73 under the folding condition. When the first antenna 51 is manually pulled up, this first antenna 51 is gradually stood, or raised as illustrated in FIG. 15B and FIG. 15C. Finally, the first antenna 51 is stood perpendicular to the rotary bezel 73 (see FIG. 15D). Under this standing condition of FIG. 15D, the rotary bezel 73 is rotated, so that the above-described selection of the signal incoming direction is carried out and is displayed on the LCD display screen 72.

As previously explained, in accordance with the fourth radio signal detecting system, this detecting system can be made compact and can be readily operated, and furthermore can simply and correctly display the radio signal incoming direction.

ARRANGEMENT/DISPLAYS OF FIFTH RADIO SIGNAL DETECTING SYSTEM

Figure 16:
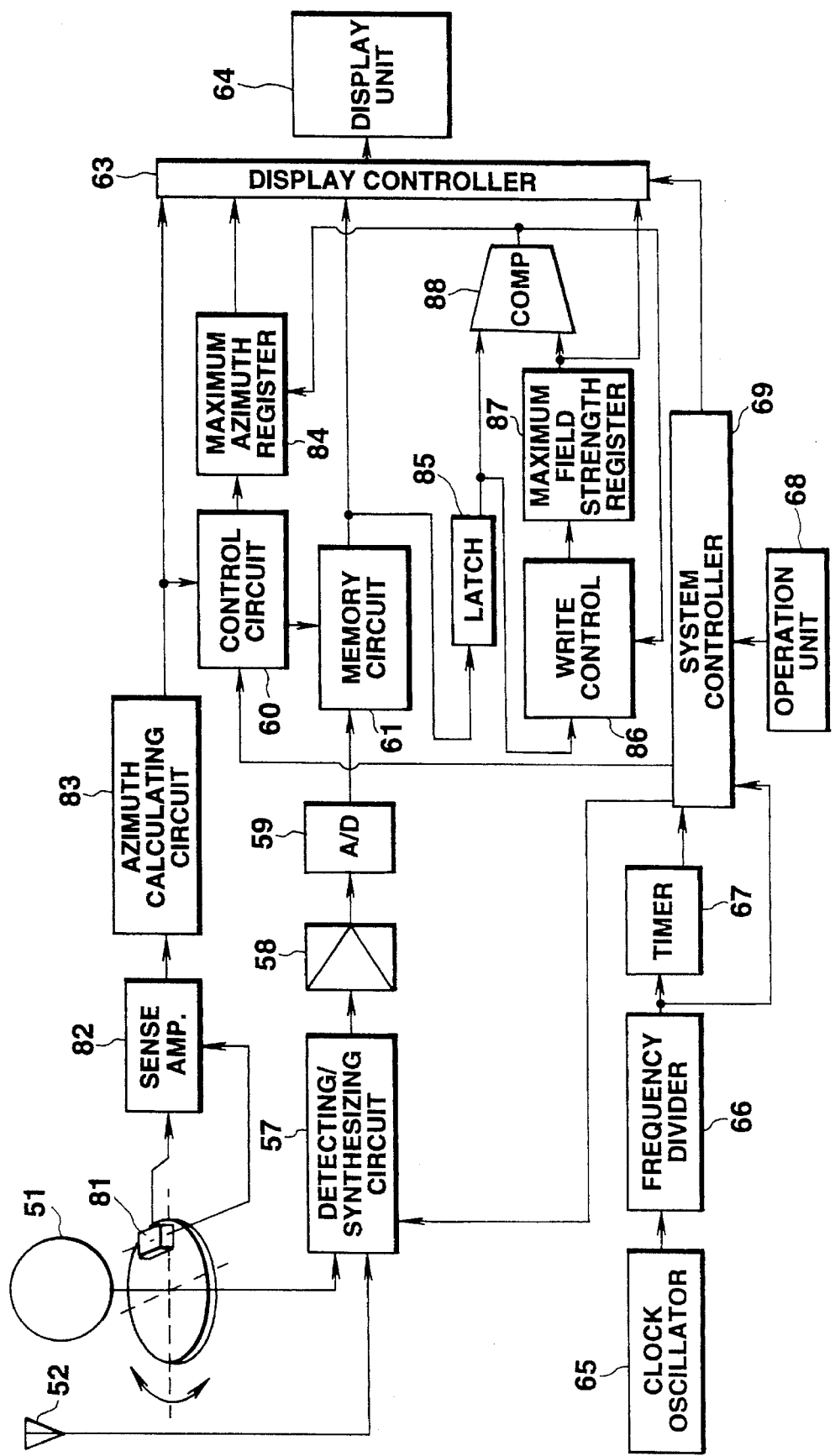
FIG. 16 is a schematic block diagram for showing an overall circuit arrangement of a radio signal detecting system according to a fifth preferred embodiment of the present invention.

In FIG. 16, there is represented an overall arrangement of a radio signal detecting system according to a fifth embodiment of the present invention. It should be noted that like reference numerals shown in the fourth embodiment refer to like circuit portions of this fifth embodiment, and therefore no further explanations thereof are made in the below-mentioned description. An electronic azimuth sensor 81 is mounted on the rotation supporting member 53 for rotatably supporting the first antenna 51. The electronic azimuth sensor 81 detects earth magnetism with very weak magnetic fields to sense the compass north. Accordingly, the rotation direction of the first antenna 51 is sensed under such a condition that the compass north at the measuring point is used as the reference azimuth. As the electronic azimuth sensor 81, a magnetoresistive element may be employed which is positioned within a space defined by, for instance, one electromagnetic coil for operation purposes and the other electromagnetic coil for applying a bias field. These electromagnetic coils are arranged on the X axis and the Y axis perpendicular to the X axis, respectively.

Figure 18:
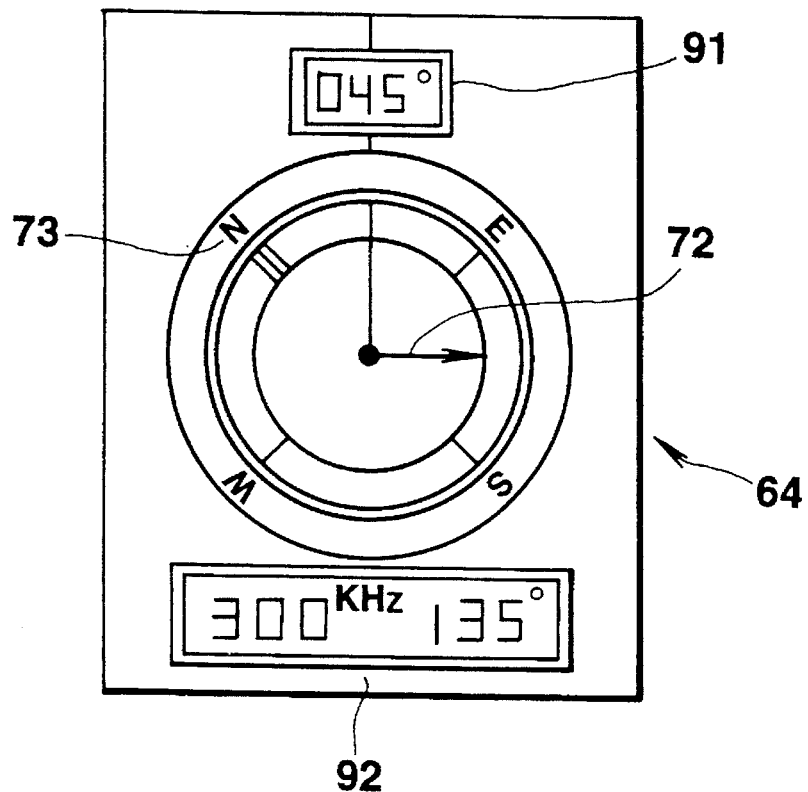
FIG. 18 is a front view of representing another display sample of the fifth radio signal detecting system.

The azimuth detection signal derived from this electronic azimuth sensor 81 is supplied via a drive circuit and a sense amplifier 82 to an azimuth calculating circuit 83. The azimuth calculating circuit 83 converts the azimuth direction analog signal for the first antenna 51 into the corresponding azimuth digital data. Based upon this azimuth digital data, the address of the memory circuit 81 is controlled in order to store the field strength corresponding to the compass north for the first antenna 51. In the fifth radio signal detecting system of FIG. 18, reference numeral 84 shows an azimuth register for detecting the maximum field strength from the received field strengths to judge the radio signal incoming direction. Reference numeral 85 represents a latch circuit for reading the field strength previously stored in the memory circuit 81, reference numeral 88 shows a maximum value register write controlling circuit for writing the maximum value read out from the latch circuit 85, and reference numeral 87 represents a register for storing the maximum value of the field strength. The maximum field strength value of this register 87 is compared with the maximum field strength value of the latch circuit 85 in a comparator circuit 88, and the comparison result is outputted to the azimuth register 84.

Figure 17:
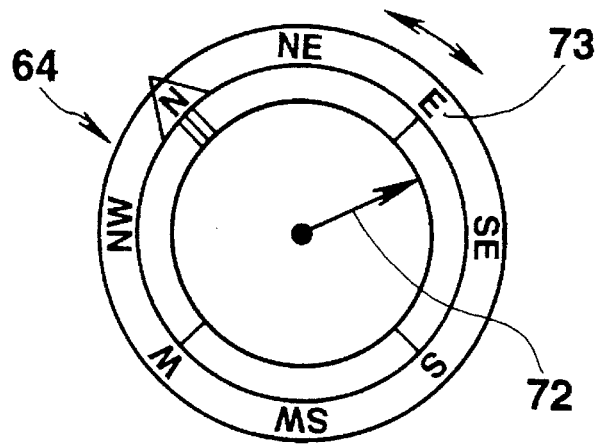
FIG. 17 is a front view for indicating a display sample of the fifth radio signal detecting system.

FIG. 17 illustrates a display screen 72 of a display unit 84 employed in the fifth radio signal detecting system. As represented in FIG. 17, a rotary bezel 73 is arranged outside the LCD display screen 72. The azimuth is represented on the rotary bezel 73, and is made coincident with the azimuth of the compass north by rotating this rotary bezel 73. As a result, an operator can recognize the azimuth of the radio signal incoming direction indicated on the LCD display screen 72.

FIG. 1B schematically shows another display unit 64 employed in the fifth radio signal detecting system. This display unit 64 is provided with a first display section 91 for displaying electronic compass azimuth. The first display section 91 indicates the azimuth of 12:00 hour of a clock measured from the compass north. Furthermore, a second display section 92 is provided which displays the frequency of the received radio signal and the incoming direction of this received radio signal by the angle measured from the compass north.

In accordance with the fifth radio signal detecting system, since the radio signal incoming direction is displayed by either the absolute direction, or the digital value from 0° to 360°, this azimuth of the radio signal incoming direction can be confirmed. While the first antenna 51 is rotated, the radio signal incoming direction can be correctly displayed irrelevant to the direction and the attitude of the fifth radio signal detecting system, resulting in improvements of operabilities thereof.

What is claimed is:

1. A radio signal detecting system comprising:
   a rotatable antenna mounted on a device body and which is rotatable relative to the device body;
   rotation signal generating means for outputting a rotation signal every time when said rotatable antenna is rotated by a preselected rotation angle;
   distance measuring means for transmitting a radio signal every time the antenna is rotated by the preselected rotation angle, and for receiving the radio signal reflected from a target to obtain distance data representing a distance between the target and said radio signal detecting system;
   a memory having a plurality of memory areas for storing distance data obtained by the distance measuring means in correspondence with a corresponding rotation signal output by said rotation signal generating means; and
   distance display means for displaying the distance data stored in the memory.

2. A radio signal detecting system as claimed in claim 1, wherein said antenna is manually rotatable by an operator.

3. A radio signal detecting system as claimed in claim 1, wherein said antenna comprises an array antenna having a waveguide with a plurality of slit-shaped elongate openings formed therein at equidistant intervals.

4. A radio signal detecting system as claimed in claim 1, wherein said memory stores the distance data obtained by the distance measuring means at least for every preselected rotation angle through 360 degrees.

5. A radio signal detecting system as claimed in claim 1, wherein said distance display means comprises analog display means for displaying the distance data stored in the memory in an analog form.

6. A radio signal detecting system as claimed in claim 1, wherein:
   said rotation signal generating means comprises angle detecting means for detecting a rotation angle of said antenna; and
   said memory is operated based on the rotation angle detected by said angle detecting means.

7. A radio signal detecting system as claimed in claim 1, further comprising:
   azimuth measuring means for measuring azimuth; and
   azimuth displaying means for displaying the azimuth measured by said azimuth measuring means.

8. A radio signal detecting system comprising:
   a wrist-watch-shaped case;
   an antenna rotatably mounted on the wrist-watch-shaped case and which is rotatable relative to said wrist-watch-shaped case;
   timer circuit means provided within said wrist-watch-shaped case, for producing present time information;
   time display means for displaying the present time information produced by said timer circuit means;
   distance measuring means for transmitting a radio signal every time the antenna is rotated by a preselected rotation angle, and for receiving the radio signal reflected from a target to obtain distance data representing a distance between the target and said radio signal detecting system;
   a memory having a plurality of memory areas for storing distance data obtained by the distance measuring means; and
   distance display means for displaying the distance data stored in the memory.

9. A radio signal detecting system as claimed in claim 8, wherein said antenna is manually rotatable by an operator.

10. A radio signal detecting system as claimed in claim 8, wherein said antenna comprises an array antenna having a waveguide with a plurality of slit-shaped elongate openings formed therein at equidistant intervals.

11. A radio signal detecting system as claimed in claim 8, wherein said memory stores the distance data obtained by the distance measuring means at least for every preselected rotation angle through 360 degrees.

12. A radio signal detecting system as claimed in claim 8, wherein said distance display means comprises analog display means for displaying the distance data stored in the memory in an analog form.

13. A radio signal detecting system as claimed in claim 8, further comprising:
   angle detecting means for detecting a rotation angle of said antenna, said memory being operated based on the rotation angle detected by said angle detecting means.

14. A radio signal detecting system as claimed in claim 8, further comprising:
   azimuth measuring means for measuring azimuth; and
   azimuth displaying means for displaying the azimuth measured by said azimuth measuring means.

15. A radio signal detecting system comprising:
   an appliance case and which is rotatable relative to said appliance case;
   a first antenna rotatably mounted on said appliance case;
   rotation signal generating means for outputting a rotation signal every time said first antenna rotates by a predetermined angle;
   a second antenna fixedly mounted on said appliance case;

electric field strength measuring means for measuring electric field strength of the radio signal reflected from a target and received by said first and second antennas every time said first antenna is rotated by a preselected rotation angle, to obtain electric field strength data;

a memory having a plurality of memory areas for storing the electric field strength data obtained by said electric field strength measuring means in correspondence with the corresponding rotation signal output by said rotation signal generating means; and display means for displaying the electric field strength data stored in said memory.

16. A radio signal detecting system as claimed in claim 15, wherein said second antenna is manually rotatable by an operator.

17. A radio signal detecting system as claimed in claim 15, wherein:

said rotation signal generating means comprises angle detecting means for detecting a rotation angle of said first antenna.

18. A radio signal detecting system as claimed in claim 15, further comprising:

azimuth measuring means for measuring azimuth; and azimuth displaying means for displaying the azimuth measured by said azimuth measuring means.

* * * * *